US011521236B1

(12) United States Patent
Billman et al.

(10) Patent No.: US 11,521,236 B1
(45) Date of Patent: *Dec. 6, 2022

(54) SYSTEM, METHOD AND APPARATUS FOR LOCATION BASED DELIVERY OF DETERMINED PERTINENT DATA

(71) Applicant: United Services Automobile Association, San Antonio, TX (US)

(72) Inventors: Bradly J. Billman, Celina, TX (US); Maland Keith Mortensen, San Antonio, TX (US); Wayne Maurice Hartman, San Antonio, TX (US); Meighan K. McNulty, San Antonio, TX (US); Craig Kincaid, Floresville, TX (US); Joshua D. Maldonado, San Antonio, TX (US); Gunjan C. Vijayvergia, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,916

(22) Filed: Apr. 16, 2020

Related U.S. Application Data

(63) Continuation of application No. 14/942,262, filed on Nov. 16, 2015, now Pat. No. 10,650,411.

(60) Provisional application No. 62/079,655, filed on Nov. 14, 2014.

(51) Int. Cl.
*G06Q 30/02* (2012.01)

(52) U.S. Cl.
CPC ..... *G06Q 30/0261* (2013.01); *G06Q 30/0269* (2013.01)

(58) Field of Classification Search
CPC .................. G06Q 30/0261; G06Q 30/0269
See application file for complete search history.

(56) References Cited

U.S. PATENT DOCUMENTS

| | | | |
|---|---|---|---|
| 9,264,151 B1 * | 2/2016 | Emigh | G06Q 30/0267 |
| 9,361,630 B1 * | 6/2016 | Goswami | H04W 4/021 |
| 10,217,130 B1 * | 2/2019 | Varma | G06Q 30/0259 |
| 2002/0065713 A1 | 5/2002 | Awada et al. | |
| 2003/0187740 A1 | 10/2003 | Tanahashi et al. | |
| 2003/0220835 A1 | 11/2003 | Barnes | |
| 2007/0265754 A1 | 11/2007 | Curtis et al. | |
| 2008/0201113 A1 | 8/2008 | Stenacker | |
| 2008/0248815 A1 | 10/2008 | Busch | |
| 2008/0249869 A1 * | 10/2008 | Angell | G06Q 30/02 705/14.1 |
| 2010/0057541 A1 | 3/2010 | Bonner et al. | |

(Continued)

*Primary Examiner* — David J Stoltenberg
(74) *Attorney, Agent, or Firm* — Locke Lord LLP; Christopher J. Capelli

(57) ABSTRACT

A system, method and apparatus for detecting the presence of a portable computing device (a smart phone device) in an area of proximity to a vendor to determine relevant pertinent information. A beacon device at a retail location establishes communication with a user's smart phone device which detection is then send to a remotely located server. The remotely located server determines if the detected portable computing device is associated with a predefined category of user. Contingent upon the category of user determination, a determination is made regarding information pertinent to the user. The pertinent information is then caused to be sent to the user's smart phone device.

6 Claims, 3 Drawing Sheets

(56) References Cited

U.S. PATENT DOCUMENTS

| | | | |
|---|---|---|---|
| 2011/0028160 A1* | 2/2011 | Roeding | H04W 4/33 |
| | | | 455/456.1 |
| 2011/0173059 A1 | 7/2011 | Benson | |
| 2011/0270773 A1* | 11/2011 | Siekman | G06Q 50/16 |
| | | | 705/305 |
| 2013/0226704 A1* | 8/2013 | Fernandez | G06Q 30/0267 |
| | | | 705/14.58 |
| 2013/0297422 A1 | 11/2013 | Hunter et al. | |
| 2014/0095318 A1* | 4/2014 | Hradetzky | G06Q 30/0251 |
| | | | 705/14.65 |
| 2014/0172479 A1* | 6/2014 | Gallagher | G06Q 10/063114 |
| | | | 705/7.15 |
| 2014/0344062 A1* | 11/2014 | Lamont | G06Q 30/0267 |
| | | | 705/14.64 |
| 2015/0095129 A1* | 4/2015 | Daigle | G06Q 20/32 |
| | | | 705/14.27 |
| 2015/0120408 A1* | 4/2015 | Liu | G06Q 30/0209 |
| | | | 705/14.12 |
| 2015/0134454 A1* | 5/2015 | Sandbrook | G06Q 30/0261 |
| | | | 705/14.58 |
| 2015/0278864 A1* | 10/2015 | McDevitt | G06Q 30/0261 |
| | | | 705/14.58 |
| 2015/0339722 A1 | 11/2015 | Hensgen et al. | |
| 2016/0071149 A1* | 3/2016 | Farshori | G06Q 30/0253 |
| | | | 705/14.51 |
| 2017/0140430 A1 | 5/2017 | Billman et al. | |

* cited by examiner

SYSTEM, METHOD AND APPARATUS FOR LOCATION BASED DELIVERY OF DETERMINED PERTINENT DATA

CROSS REFERENCE TO RELATED APPLICATIONS

This application is a Continuation of U.S. patent application Ser. No. 14/942,262 filed Nov. 16, 2015, which is incorporated herein by reference in its entirety.

FIELD OF THE INVENTION

This invention relates to a communication system and to a communication method. In particular it relates to a system comprising a network of beacons and to a method of providing pertinent information.

BACKGROUND OF THE INVENTION

In order to improve the consumer experience, an improved system is needed for identifying and/or tracking consumers, and for transmitting pertinent information to individual consumers based upon the consumers' membership affiliations.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system, method and apparatus for detecting the presence of a portable computing device (a smart phone device) in proximity area of the detection associated with a vendor to determine relevant pertinent information is described in which a beacon device at a retail location establishes communication with a user's smart phone device which detection is then send to a remotely located server. The remotely located server determines if the detected portable computing device is associated with a predefined category of user. Contingent upon the category of user determination, a determination is made regarding information pertinent to the user. The pertinent information is then caused to be sent to the user's smart phone device.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
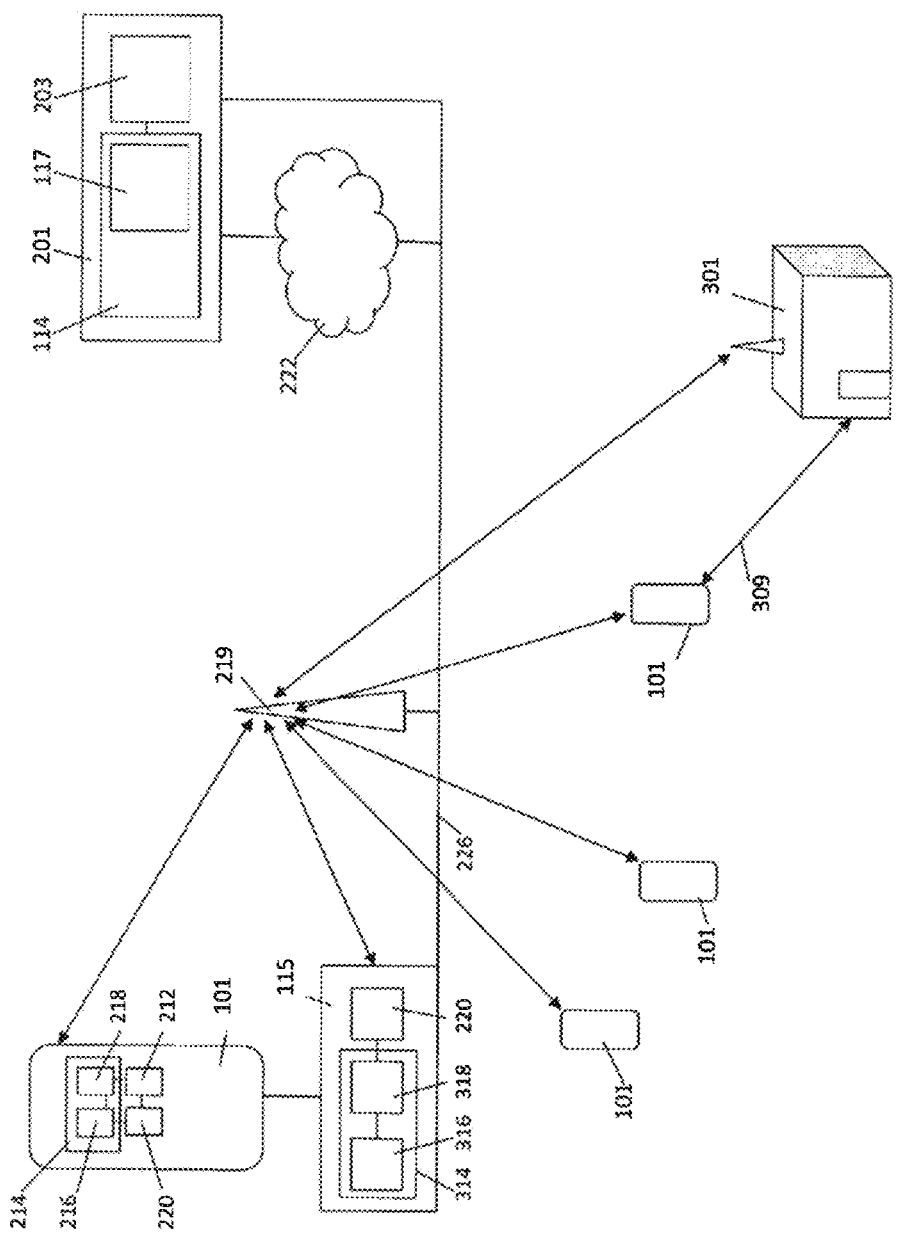
FIG. 1 illustrates communications between portable computing devices, stores and the system server.

With reference to FIG. 1, the present invention includes a system and method for transmitting store advertising information directly to consumers through their mobile phones 101. The system includes one or more servers 201, cell phones 101 and one or more communications networks which can be cellular networks 219, the internet 222 and other networks including wired and wireless networks, LAN, WiFi, WiMax, etc. The server includes a microprocessor 114 that performs software instructions. The microprocessor 114 is coupled to databases 203 that store information about the consumers, product and advertising and rules for distribution of the advertising and a rules engine 117 that is the software instructions that are performs by the microprocessor 114. Each cell phone 101 also includes a microprocessor 214 that runs an operating system 216 and downloaded application software 218. The phone 101 also has memory and databases 220 for storing system offers and information. One of the features of the inventive system is the ability to determine where the consumers are based upon the locations of their mobile phones 101. Many mobile phones 101 are equipped with global positioning system (GPS) units 212 that provide precise location information. The cell phones can transmit this information to the system and the server can determine how close a consumer is to a store 301. The system can also determine if the consumer is within the store 301. If GPS is not available, various other location detection mechanisms can be used to determine the location of the consumer and distance 309 from the store 301.

Because the advertising transmitted by the inventive system can be targeted to each individual consumer, there is a much better correlation between consumers' interests and the transmitted advertising than traditional advertising, such as print, outdoor billboards or television advertising. Since the transmitted advertising is targeted based upon consumer information and location, the inventive system will be able to predict the consumers' purchasing interest. For the first time, the broken offline retail sales loop could be closed, with the inventive system, by using mobile phones, which are the only interactive medium consumers carry with them, including in the moment when they are about to or are in the process of shopping at physical retail stores.

The implications for both consumers and retailers are substantial. Through the inventive system, retailers can tailor their offers, advertising information and incentives/rewards to consumers along the whole chain, from advertising, to promotions, to walking in and out of different stores, to walking into a specific store, to viral effects when consumers discuss retail experiences or products with their friends; then it is likely the consumer experience would improve drastically with more useful offers, and for the retailers, the increase in efficiency of advertising spend, consumer basket size and close rate would be substantial. In order to encourage activities that are associated with purchasing, the inventive system provides rewards such as points that can be accumulated and redeemed for merchandise at the stores, or for digital goods (song downloads, virtual goods etc).

It should be appreciated that the present invention can be implemented in numerous ways, including as a process, an apparatus, a system, a device, a method, a computer readable medium such as a non-transitory computer readable storage medium containing computer readable instructions or computer program code, or as a computer program product comprising a computer usable medium having a computer readable program code embodied therein.

It is to be appreciated that a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, solid state drives, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention, or they are available via a web service. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An illustrated embodiment facilitates a mass-capable, scalable service that allows targeted personalized rewards and offers based on identification of the consumer's individual presence and profile not at the point-of-sale, but instead at the point-of-entrance to an offline, physical store, or shortly before the point-of-entrance. In order to increase foot traffic, the inventive system provides members with personalized offers or discounts as soon as they walk into a store or within the proximity of a store.

Thus, rather than providing the offers and rewards randomly, the inventive system has triggers that produce the offers and rewards. Various triggers can be detected by the system which can determine an optimum offer that can be based upon consumer location and time. For example, in order to stimulate purchases, personalized rewards and offers can be transmitted from the server to the mobile phone when the customer enters the store, or when she/he gets close to a store (e.g. by preemptively downloading data relevant to a store, either when near the store or because the store is frequently visited, to avoid potential lack of that data in case of loss of wireless reception in the store; in various embodiments, such preemptive downloading may be initiated by the client and/or by the server).

Figure 2:
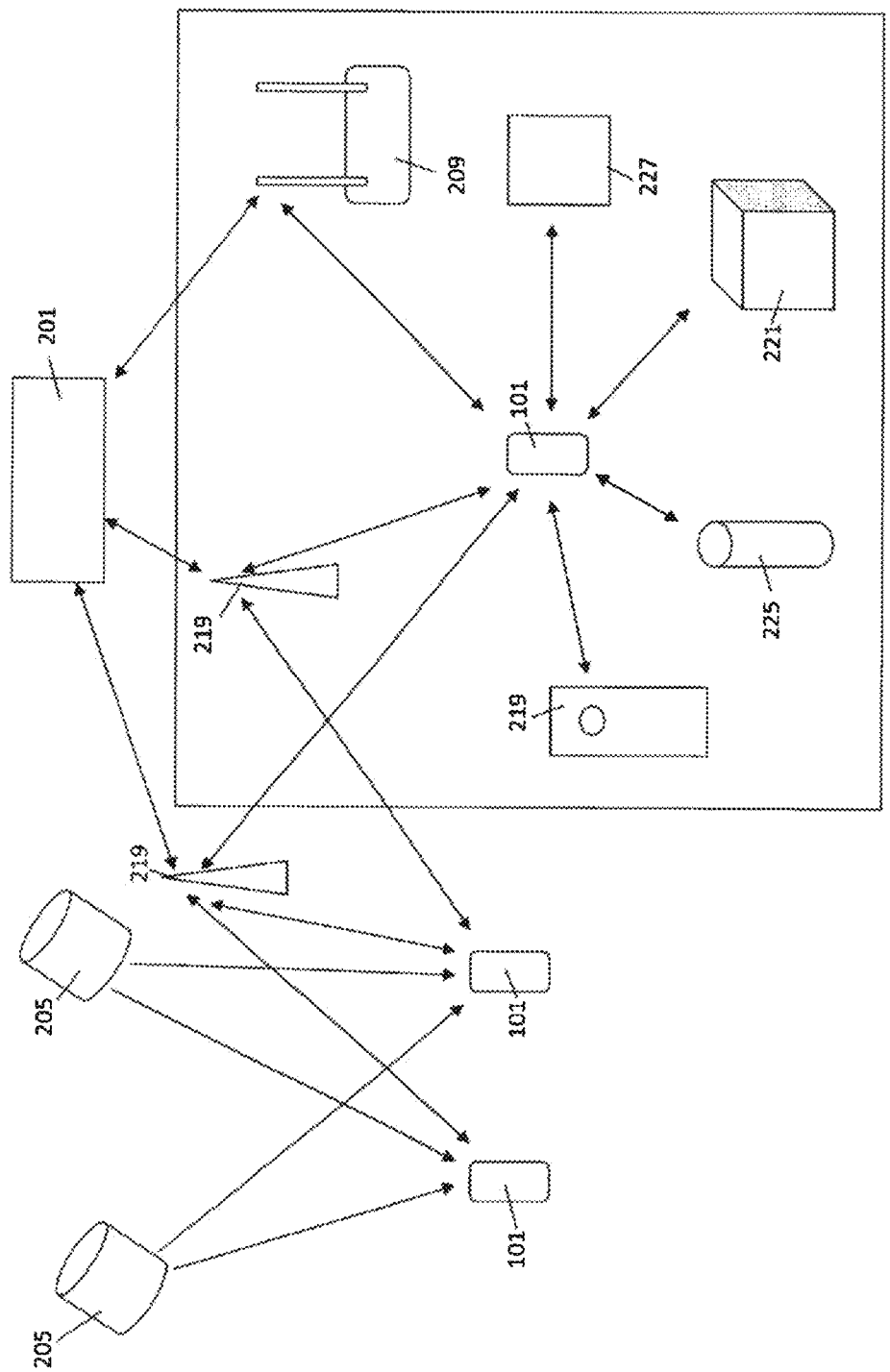
FIG. 2 illustrates detection systems used to detect the locations of the portable computing devices.

With reference to FIG. 2, various systems can be used to determine the location of the cell phones including: GPS 205, WiFi 209, Wifi beacon identification (without data connectivity), Cell Phone Signals ("Cell ID") 211, short range RF signals 215 including RFID, BlueTooth, PANs, Sound or Sound Pattern Identification (e.g. ultrasonic sound) 219, Magnetic Field detection 221, 1-Dimensional or 2-Dimensional Barcodes, and/or Recognition of Device ID's (e.g. MAC addresses of cell phones). In other embodiments, the inventive system can have transmitter/sensors 225 mounted at the entrance(s) of the stores that detect cell phones as they enter and exit, or elsewhere in the store.

To determine when the user is crossing or has crossed a physical threshold, e.g. a store 301 entrance (which in turn triggers personalized rewards and offers), various techniques may be employed including: rapid degradation of GPS 205 signals, rapid improvement of the WiFi 209 signal, a combination of GPS 205 signal degradation and WiFi 209 signal improvement, a sudden decrease of location data accuracy, sound 219 identification (ultrasonic and/or sound pattern recognition), magnetic field 221 detection, RF signal detection, 1-D or 2-D Barcode Recognition, Recognition of Device ID's (e.g. MAC addresses of cell phones), manual data entry, and/or other methods. The listed detection methods are described in more detail below.

In an illustrated embodiment, a trigger can include a rapid degradation of GPS 205 signals. GPS 205 technology, including systems integrated into smart phones 101, typically determines location fixes by analyzing data from several (e.g. four or more) satellites which are in a line-of-sight, i.e. "visible" (=unobstructed view) connections. When users of the service walk into a store 301 or other enclosed location, the cell phones 101 frequently lose contact with one or more of the satellites from which signals could previously be received (e.g. at least two out of four satellites) due to signals blocked by the walls and roof or other structures. Such rapid degradation of the GPS 205 signal can serve as a trigger for determining the consumer has entered the store 301, for example in combination with the previous proximity to the store location, and other data.

Figure 3:
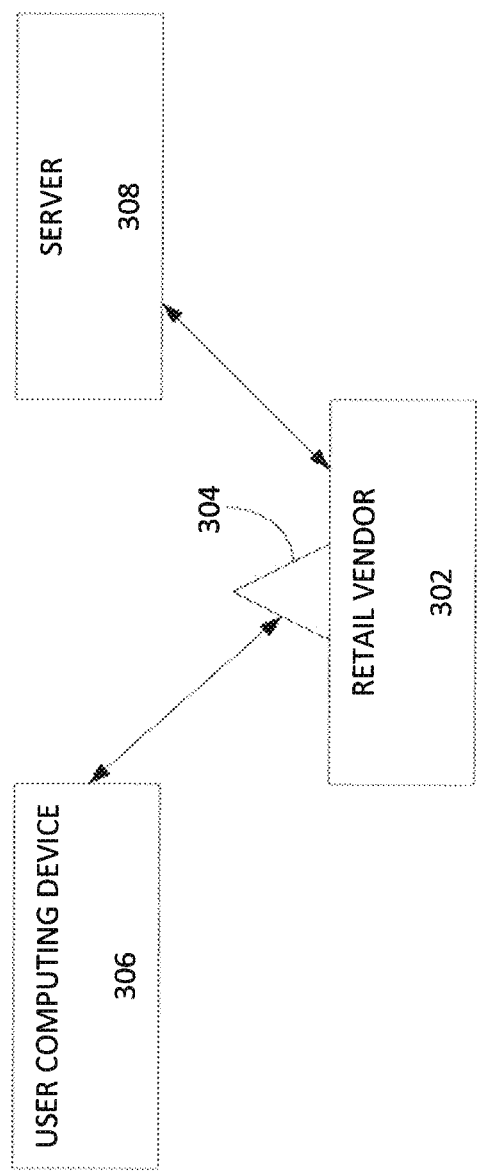
FIG. 3 illustrates another illustrated embodiment between portable computing devices, stores and the system server.

With reference now to FIG. 3 (and in accordance with the above teachings of FIGS. 1 and 2), another illustrative embodiment is depicted in which, and as described above, preferably a retail location 302, is provided with device (e.g., a beacon device) 304 for detecting a portable computing device 306 that comes into a geo-fence proximity area monitored by the beacon device 304. It is to be appreciated the portable computing device 306 is preferably a smart phone device associated with a user but may also encompass other suitable portable computing devices, such as a tablet device. The aforesaid beacon device 304 is communicatively coupled to a computer/server 308 located remotely from the retail location 302 associated with the beacon device 304, the significance of which will become from the below description.

In operation, the remotely located server 308 establishes communication with the beacon device 304 so as to receive signals from the beacon device 304 indicating presence of a portable computing device 306 relative to the beacon device 304, and the retail shop 302. The server 308 then determines from the signal received from the beacon device 304 if the detected portable computing device 306 is associated with a predefined category of user or a rules based grouping based on previous user data and/or user profile. A predefined category of user can be user's who are members of an insurance carrier, such as USAA™. It is to be appreciated a category of user can be defined as any type of grouping, or sub-grouping, having at least one binding characteristic (e.g., gender, likes, associations, military ranking, etc.). The server then determines information that may be pertinent to the user, based on the user's current location. The pertinent information, may include (and is not restricted to): one or more items (preferably sold by the retailer 302) contemplated for purchase by a user (which may include pricing and/or inventory levels and other metrics associated with goods (such a size and/or weight)); an item or service determined needed by the server 308 based on analytics on user information stored in the server (e.g., determines air filter elements are needed based on dwelling maintenance schedules); and/or a decision recommendation based on a user's finances (e.g., user may be scheduled to incur significant expenses in next two weeks). The pertinent information may also encompass the availability and/or pricing of an item contemplated for purchase located in another retail location.

It is to be appreciated the server 308 may determine information pertinent to the user based on the determined user category. For instance, a first level of information may be provided if the user is determined to be a member of the USAA insurance company and a second level of enhanced information may be provided if the user is determined to be in a certain sub-category (e.g., subscribes to three or more services offered by USAA). Once the aforesaid pertinent information is determined by the server 308, it is caused to be sent from the server 308 to user's portable computing device 306, preferably via the beacon device 304 (or via other networking channels capable of being established between the server 308 and the user's portable computing device 306 (including, but not limited to: cellular and WiFi)).

It is to be appreciated the detection device (e.g., beacon device 304) is configured to send a signal to each detected portable computing device 306 independent of the information signal sent from the server 308. For instance, while the server 308 may send a signal to a user's device 306 indicating an air filter element should be purchased, the beacon device 304 may send a signal to the user's device 306 indicating daily specials associated with the retail vendor 302. Alternatively, a user's device 306 may only receive an information signal from the beacon 304 if it is determined the user of the detected smart phone device 304 is associated with a predefined user category. For instance, information is only sent to user's who are members of the USAA insurance company.

It is to be further appreciated the detection device (e.g., beacon device 304) is located in a vehicle parking lot associated with the retail vendor 302 such that the user is provided with pertinent information prior to entering the retail vendor 302. For instance, such pertinent information may include (and is not limited to): item inventory/availability; pricing and size/dimensions (to determine whether an item contemplated for purchase can be accommodated by the vehicle currently being used by the user).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A beacon detection device for detecting the presence of a user smart phone device to provide pertinent information to the user when the user is located in a parking lot in proximity to a retail store, comprising:
a beacon antenna mountable in a parking lot that is in proximity to a retail store operably coupled to a server having at least one database storing information associated with a plurality of users and a processor operably coupled to at least one database and the beacon antenna, wherein the beacon detector:
detects the presence of the user smart phone device in the parking lot;
determines a user of the detected user smart phone device;
determines one or more items required for purchase by the user based on analytics performed by the server on user information stored in the database, based on a dwelling maintenance schedule associated with the user, while the user is located in the parking lot in proximity to the retail store;
determine product availability of one or more items determined required for purchase in the retail store by the user while the user is located within the parking lot, and prior to the user's entrance into the retail store; and
cause a signal to be transmitted from the beacon antenna with pertinent information to the user smart phone device located in the parking lot indicating product availability of the one or more items determined required for purchase by the user while located in the parking lot prior to the user's entrance into the retail store.

2. The beacon detection system as recited in claim 1 wherein the processor is further configured to determine a packaging size associated with the one or more items determined required to be purchased by the user while the user is located within the parking lot.

3. The beacon detection system as recited in claim 2 wherein the processor is further configured to determine whether a vehicle associated with the user can accommodate the determined packaging size of the one or more items determined required to be purchased by the user while the user is located in the parking lot.

4. The beacon detection system as recited in claim 1 wherein the user smart phone device is a tablet device.

5. The beacon detection system as recited in claim 1 wherein the processor is further configured to determine pricing information associated with the one or more items determined required to be purchased by the user while the user is located in the parking lot.

6. The beacon detection system as recited in claim 5 wherein the processor is further configured to provide notice to the user indicating the determined pricing information associated with the one or more items determined required to be purchased by the user while the user is located in the parking lot.

* * * * *